(12) United States Patent
Lee et al.

(10) Patent No.: US 6,531,808 B2
(45) Date of Patent: Mar. 11, 2003

(54) BEAM INDEX TYPE CATHODE RAY TUBE

(75) Inventors: Sung-Soo Lee, Seoul (KR); Jae-Ho Lee, Ansan (KR); Jong-Sik Choi, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 177 days.

(21) Appl. No.: 09/792,037

(22) Filed: Feb. 26, 2001

(65) Prior Publication Data

US 2001/0022491 A1 Sep. 20, 2001

(30) Foreign Application Priority Data

Feb. 25, 2000 (KR) .............................................. 00-9457

(51) Int. Cl.⁷ ................................................ H01J 29/34
(52) U.S. Cl. ........................ 313/2.1; 313/413; 313/426; 313/458; 315/382.1
(58) Field of Search ................................. 313/201, 413, 313/418, 421, 426, 440, 458; 315/15, 17, 382.1

(56) References Cited

U.S. PATENT DOCUMENTS 4,994,704 A * 2/1991 Takenaka et al. ............ 313/2.1
5,952,767 A * 9/1999 Kuwabara et al. ........... 313/2.1

FOREIGN PATENT DOCUMENTS

JP         62-176036         8/1987

* cited by examiner

Primary Examiner—Ashok Patel
(74) Attorney, Agent, or Firm—Staas & Halsey LLP

(57) ABSTRACT

A beam index type cathode ray tube having a screen divided into a plurality of areas and a plurality of electron guns corresponding to the divided screen areas. The beam index type cathode ray tube includes a tube of which inner atmosphere is maintained in a vacuum state and a screen formed at one side of an inner surface of the tube. The screen has phosphor stripes and index stripes. A plurality of electron guns are mounted in the tube facing the screen and a plurality of deflectors are mounted on the tube corresponding to the electron guns to deflect electron beams which are radiated from the electron guns to the screen. A plurality of detectors are mounted on the tube corresponding to the electron guns to sense lights emitted from the index stripes.

7 Claims, 3 Drawing Sheets

BEAM INDEX TYPE CATHODE RAY TUBE

CROSS-REFERENCE TO RELATED APPLICATIONS

This application claims the benefit of Korean Application No. 2000-9457 filed Feb. 25, 2000, in the Korean Patent Office, the disclosure of which is incorporated herein by reference.

BACKGROUND OF THE INVENTION

1. Field of the Invention

The present invention relates to a beam index type cathode ray tube, which includes a plurality of deflection units, a plurality of electron guns and a screen divided into a plurality of parts in order to realize high quality images.

2. Description of the Related Art

A beam index type cathode ray tube is designed for reducing problems associated with general cathode ray tubes, in which sensed index signals, which are excited by an electron beam emitted by an electron gun, are synchronized with color signals and reach desired positions to allow phosphors to emit lights, thereby realizing images.

The beam index type cathode ray tube has the advantages that mis-landing of electron beams due to doming of a shadow mask does not occur since the shadow mask is not employed as a color selection apparatus, and that misconvergence due to crossing of red R, green G and blue B electron beams is prevented since color images are realized by a single electron gun.

However, a problem of the beam index type cathode ray tube is that the electron beam should be limited to an optimum size in order to prevent the electron beam from colliding against phosphors other than a desired single color of phosphor and landing the electron beam on a peripheral part of a screen at an incline should be avoided.

Further, the beam index type, as described above, selects landing positions of the electron beam by sensing index signals so that a persistence time of index phosphors becomes an important factor in order to distinguish the index signals according to the synchronization of the color signals.

If the persistence time of the index phosphors becomes too long, the index signals are not distinguished and accordingly, assignment of the color signals becomes impossible. Therefore, in the related art, a beam index type cathode ray tube employs extremely short persistence time index phosphors.

In order to realize high resolution where the beam index type cathode ray tube is applied to HDTVs or digital TVs, the persistence time of the index phosphors should be much shorter than that of the existing index fluorescent substances, since a high frequency deflection velocity (approximately 30 kHz or more) of the HDTV or digital TV systems is faster than a high frequency deflection velocity (approximately 15.75 kHz) of the existing NTSC or PAL systems.

However, index phosphors satisfying the above condition have not been suggested specifically, so that the high resolution images can not be realized by the beam index type cathode ray tube.

Japanese laid-open publication No. 62-176036 discloses a beam index type color picture tube to resolve the above problems by changing a geometrical shape of the beam index type cathode ray tube.

The color picture tube includes a faceplate with a screen that is divided into a plurality of parts, necks connected with the faceplate through a funnel, and a plurality of electron guns fitted within the necks and deflecting yokes.

The color picture tube is structured to realize images by radiating electron beams which are emitted by the plurality of electron guns onto divided small regions of a screen to reduce a distance between the electron guns and the screen, that is, the whole length of the tube, wherein a size of the electron beams which collide against phosphors of the screen becomes reduced, so that the problems of collision of any colors of phosphors other than a desired color phosphor and the inclination of the electron beams may be resolved.

However, the above color picture tube has a disadvantage that the resolution over the whole screen is not maximized over a certain limit since only a single detector is mounted to sense the index light beams.

A problem results from the sequential radiation of electron beams with relation to the divided screen. For example, if the screen is divided into four areas and the radiation of the electron beams is carried out sequentially as above, it is difficult to maintain a deflection frequency above 15.75 kHz due to the persistence of the phosphors, and accordingly, the deflection frequency over the whole screen is limited to 15.75 kHz. In other words, the resolution of the color picture tube is achieved at about 500×500 as in the existing broadcasting systems such as NTSC.

SUMMARY OF THE INVENTION

Therefore, an object of present invention is to resolve the above disadvantages and problems of the related art and to provide a beam index type cathode ray tube which is implemented as a high resolution display system by maximizing resolution with relation to a whole screen, where a screen area is divided into a plurality of areas and provided with electron guns corresponding to the divided areas to realize images.

Additional objects and advantages of the invention will be set forth in part in the description which follows, and, in part, will be obvious from the description, or may be learned by practice of the invention.

In order to achieve the above and other objects of the present invention, a beam index type cathode ray tube includes a tube of which inner atmosphere is maintained in a vacuum state. A screen having phosphor stripes and index stripes is formed at one side of an inner surface of the tube and a plurality of electron guns are mounted in the tube facing the screen part. A plurality of deflection units which deflect electron beams which are radiated from the electron guns to the screen, are mounted on the tube corresponding to the electron guns. A plurality of detectors mounted on the tube corresponding to the electron guns sense lights emitted from the index stripes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which.

DETAILED DESCRIPTION OF THE PREFERRED EMBODIMENTS

Figure 1:
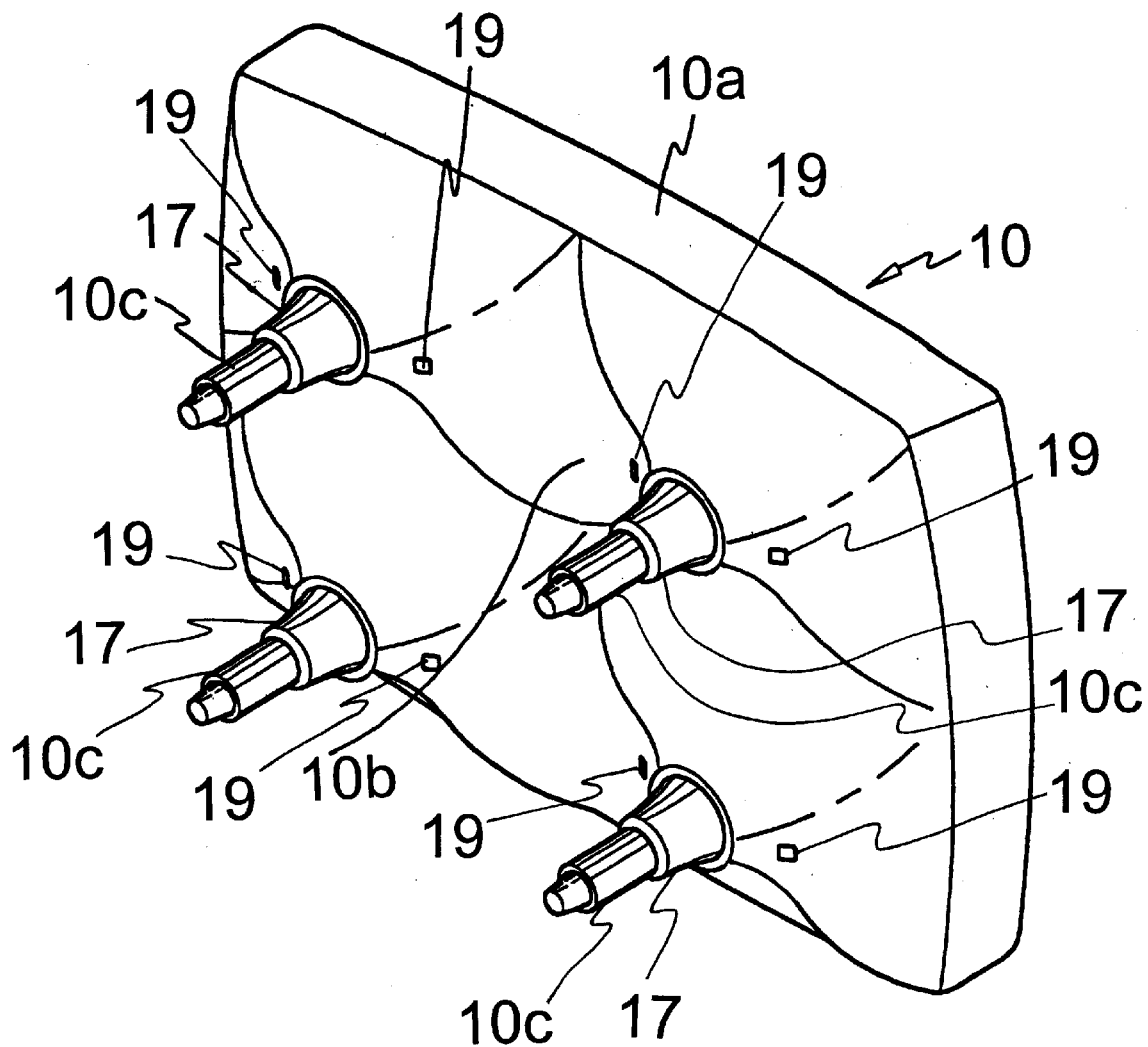
FIG. 1 is a perspective view of a beam index type cathode ray tube according to an embodiment of the present invention.

Reference will now be made in detail to the present embodiments of the present invention, examples of which are illustrated in the accompanying drawings, wherein like reference numerals refer to like elements throughout.

FIG. 1 is a perspective view of a beam index type cathode ray tube according to an embodiment of the present invention. Referring now to FIG. 1, a cathode ray tube includes a tube 10 in which an inner atmosphere is maintained in a vacuum state. The tube 10 includes a panel 10a which forms a front glass, a funnel 10b connected to a rear part of the panel 10a and a plurality of necks 10c connected to a rear part of the funnel 10b.

Figure 2A:
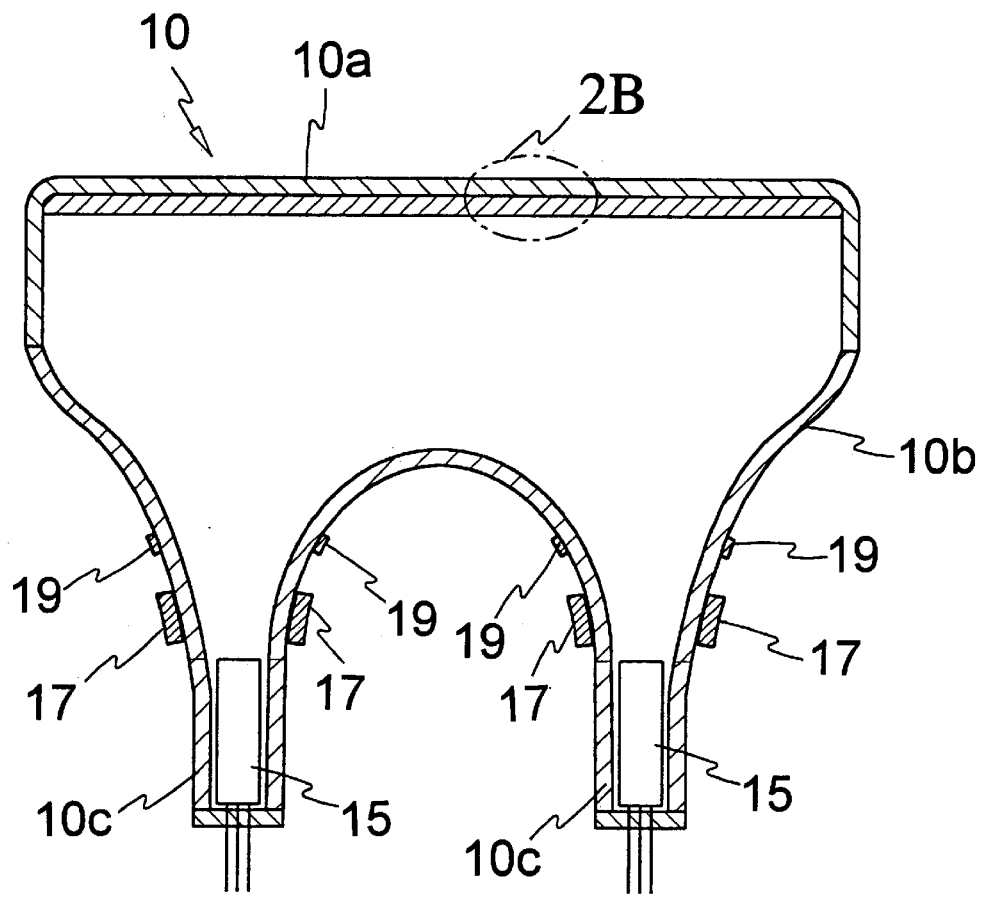
FIG. 2A is a cross-sectional view of a beam index type cathode ray tube according to an embodiment of the present invention.
Figure 2B:
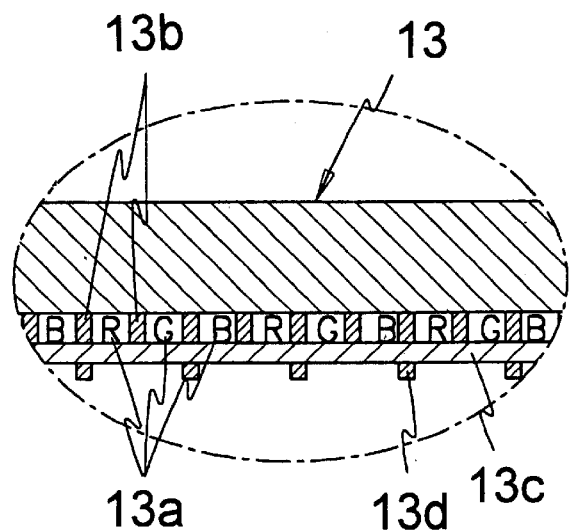
FIG. 2B is an enlarged view of a portion of FIG. 2A.

In the tube 10, a screen 13 is formed on an inner surface of the panel 10a and includes red R, green G and blue B phosphor stripes 13a, wherein the phosphor stripes 13a are formed in a stripe shape, a black matrix 13b is disposed between the phosphor stripes 13a and an aluminum metal layer 13c is formed over the phosphor stripes 13a and the black matrix 13b as shown in FIG. 2B.

Further, index stripes 13d which generate index signals are formed on the aluminum metal layer 13c of the screen 13, wherein the index stripes 13d are formed on the aluminum metal layer 13c at positions corresponding to the black matrix 13b.

Figure 3:
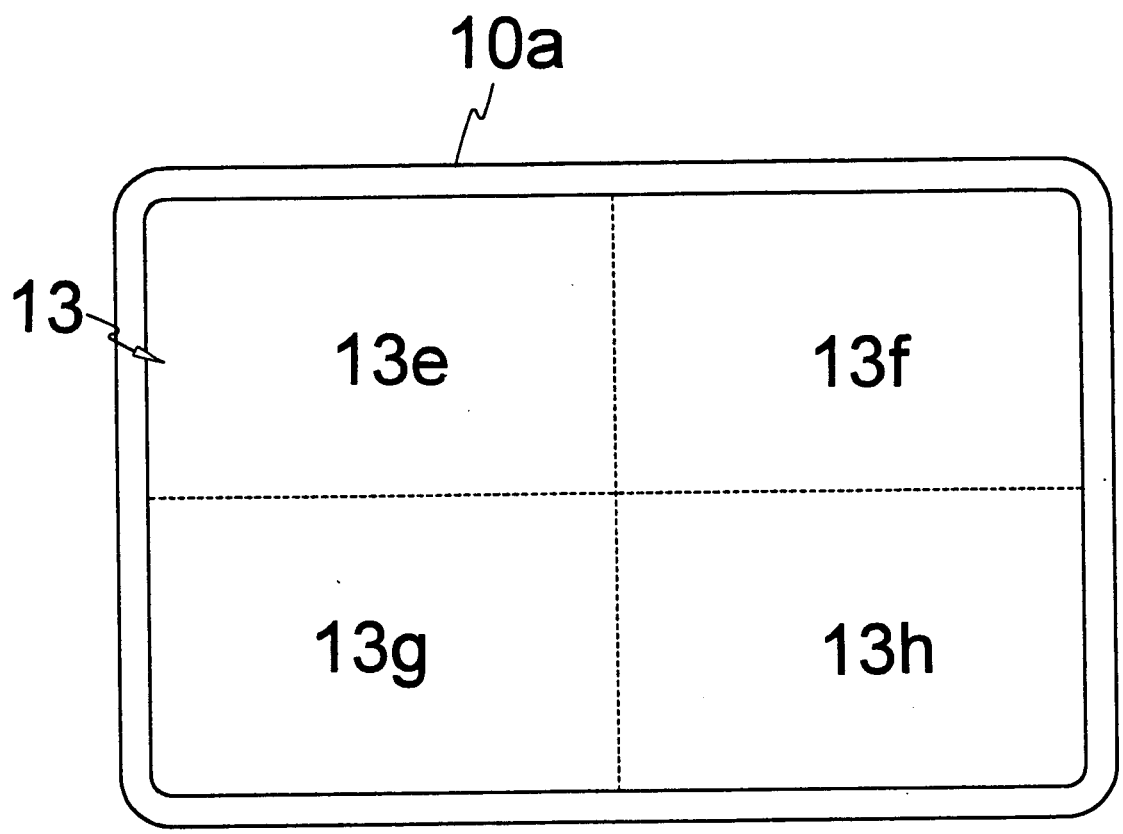
FIG. 3 is a schematic view for explaining a screen part according to an embodiment of the present invention.

A plurality of electron guns 15 which radiate electron beams to the screen 13 are mounted on the tube 10 as shown in FIG. 2A. In the cathode ray tube, the screen 13 is divided into a plurality of areas as shown in FIG. 3, and the electron guns 15 are provided corresponding to the divided screen areas, so that electron beams generated by the electron guns 15 are radiated only to corresponding predetermined areas in the screen 13 to realize images.

In order to achieve such image realization, a plurality of necks 10c are formed on the funnel 10b and incorporated with the electron guns 15. The screen 13 is divided into a plurality of areas. In one embodiment of the present invention, four electron guns 15 are provided and the screen 13 is divided into four areas 13e, 13f, 13g and 13h, as shown in FIG. 3.

In the above structure, a plurality of deflectors 17 are mounted on an outer periphery of the funnel 10b, each of which is disposed with a respective electron gun 15. Each deflector 17 deflects an electron beam radiated from a corresponding electron gun 15 to one of the corresponding areas 13e, 13f, 13g and 13h of the screen 13.

A plurality of detectors 19 are mounted on the funnel 10b to sense the lights from the index stripes 13d. A pair of detectors 19 is provided corresponding to each electron gun 15 on the funnel 10b and the detectors are disposed at both sides of each electron gun 15 facing each other as shown in FIG. 2A.

In the beam index type cathode ray tube constructed as above, a certain image is realized on the screen 13 by radiating the electron beams formed by the respective electron guns 15 to the corresponding divided areas 13e, 13f, 13g and 13h of the screen 13, wherein the lights from the index stripes 13d are separately sensed by the detectors 19 of the corresponding areas.

In other words, in the above beam index type cathode ray tube, the electron beams are simultaneously radiated by the plurality of electron guns 15 with relation to the divided screen 13 for realizing a certain image, wherein the index signals required for the driving of the respective electron guns 15 are generated by sensing lights of the index stripes 13d emitted from the corresponding divided areas 13e, 13f, 13g and 13h of the screen 13 using the respective detectors 19.

As described above, where the screen 13 is divided into a plurality of areas 13e, 13f, 13g and 13h and the electron guns 15 simultaneously carry out the radiation of the electron beams with relation to the divided screen 13, deflection frequencies of the respective deflection units 17 effectively become the whole deflection frequency (15.75 kHz) of the existing beam index type cathode ray tube, so that the present cathode ray tube increases the effective deflection frequency of the whole screen 13 to four times the deflection frequency of a conventional cathode ray tube, that is, 15.75×4 kHz.

Therefore, where resolution of the respective divided areas of the screen 13 is assumed to be achieved as 500×500, a resolution of the whole screen 13 is improved to approximately 1000×1000, wherein resolution of horizontally divided areas is 1000, i.e., (500×2), and resolution of vertically divided areas is 1000, i.e., (500×2).

As described above, the beam index type cathode ray tube according to the present invention includes a plurality of detectors which sense lights of the index stripes which are emitted from the divided screen, thereby improving the resolution by increasing the whole deflection frequency of the screen. Therefore, such a beam index type cathode ray tube of the present invention realizes high resolution even in a large-sized screen and is usefully applied to HDTVs and digital TVs.

A method of using the cathode ray tube of the present invention is summarized as follows. An incoming video signal which corresponds to a video image is divided so that respective portions of the video image correspond to predetermined areas of the screen. Each of the electron guns sweeps a respective one of the plurality of predetermined areas during the same interval as the other electron guns sweep respective other ones of the predetermined areas so that the divided images are applied to the screen in parallel rather than in sequence in order to display the whole of the video image. Thus, the effective sweep rate of the entire screen is increased.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A beam index type cathode ray tube comprising:
   a tube having an inner atmosphere maintained in a vacuum state;
   a screen formed at one side of an inner surface of the tube and having phosphor stripes and index stripes;
   a plurality of electron guns each of which radiates an electron beam, the electron guns mounted in the tube and facing;
   a plurality of deflectors mounted on the tube which deflect the electron beams, each of the plurality of deflectors corresponding to a respective one of the plurality of electron guns and deflecting the respective electron beam; and
   a plurality of detectors which sense lights emitted from the index stripes, each detector mounted on the tube and corresponding to one of the electron guns.

2. The beam index type cathode ray tube of claim 1, wherein the screen is divided into a plurality of areas and the electron guns are mounted in the tube at positions corresponding to the divided screen areas.

3. The beam index type cathode ray tube of claim 1, wherein the detectors corresponding to a respective one of the plurality of electron guns are disposed at both sides of the respective electron gun on the tube.

4. The beam index type cathode ray tube of claim 2, wherein a number of the plurality of areas is four.

5. The beam index type cathode ray tube of claim 2, wherein the electron guns are adapted to be driven simultaneously by a plurality of signals, each of the plurality of signals corresponding to a portion of a video image.

6. A method of displaying a video image on a beam index cathode ray tube having a screen with a plurality of predetermined areas and a plurality of electron guns, each electron gun adapted to sweep a respective one of the predetermined areas of the screen according to a respective signal, the method comprising:

dividing a signal corresponding to the video image to generate a plurality of the respective signals; and simultaneously sweeping the plurality of areas according to the respective signals to reconstruct the video image on the screen.

7. The method of claim 6, wherein a number of the plurality of electron guns and a number of the plurality of predetermined areas is four.

* * * * *